United States Patent Office 3,030,361
Patented Apr. 17, 1962

3,030,361
BUTYROLACTONE DERIVATIVES
Hans Willi Zimmer, Cincinnati, Ohio, and James M. Holbert, Lookout Mountain, Tenn., assignors to The Chattanooga Medicine Company, Chattanooga, Tenn., a corporation of Tennessee
No Drawing. Filed July 14, 1958, Ser. No. 748,143
9 Claims. (Cl. 260—240)

The instant invention relates to novel organic compounds and a novel method of preparing the same, and more particularly, to novel butyrolactone derivatives and their preparation.

Although the compounds of the invention may have a number of uses in various fields they are particularly useful as pharmaceutical compounds and/or chemical intermediates in the synthesis of pharmaceutical compounds. The compounds of the invention may function as a uterine depressant and antispasmodic for smooth muscle.

In addition, the compounds of the invention may display antibacterial activity comparable to that of the well known sulfa drugs, sulfanilamide and sulfadiazine. In this respect, it should be noted that certain bacteria such as Streptococcus pyogenes, Micrococcus pyogenes, and Escherichia coli tend to become resistant to the known sulfa drugs, although they may be particularly sensitive to a new sulfa compound. It is believed that exposure of such bacteria to known sulfa drugs often tends to result in the survival of a strain resistant to such drugs, but still sensitive to a new drug to which the strain has not yet been exposed. There is thus a great need for new compounds which display antibacterial activity.

It is, therefore, an improtant object of the instant invention to provide new and useful butyrolactone derivatives.

It is another object of the instant invention to provide novel methods of producing such butyrolactone derivatives.

Other and further objects, features and advantages of the present invention will become apparent to those skilled in the art from the following detailed disclosure thereof.

The instant invention consists in a compound having the formula:

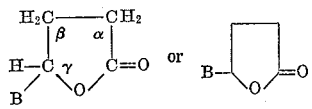

wherein X is a $C_1$–$C_4$ hydrocarbon group, each D is selected from the group consisting of H and $C_1$–$C_4$ alkyl, $x$ is an integer from 1 to 2, each R is selected from the group consisting of —$NO_2$, —$NH_2$, —NHD, —NHCOD and —$NHSO_2C_6H_4E$, wherein E is selected from the group consisting of —H, —$NH_2$, —$NHCOCH_3$, —$NO_2$, —NHD, and —$ND_2$, and A is selected from the group consisting of

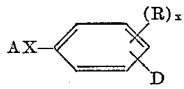

wherein B is selected from the group consisting of —H and —$CH_3$; and the invention also consists in the method of preparing such compound.

Some of the compounds of the instant invention are formed by the nitration of known starting materials, in accordance with a novel nitration step; other compounds of the invention are prepared by converting the nitro group of such nitration product to an amino group, by a novel reducing reaction; and still other compounds of the invention are formed by reacting the resulting novel amino compounds with reactants which will substitute another group for one of the amino H's. The process steps will be described hereinafter in sequence, and the compounds produced as a result of each process step will be described in the portion of the specification relating to such process step.

In general, the compounds of the invention are alpha substituted gamma-butyrolactones. The gamma-butyrolactone ring has the following formulae:

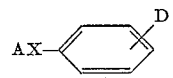

wherein B is H or $CH_3$. Strictly speaking the compound is gamma-valerolactone when B is $CH_3$, but this compound is also gamma-(methyl)-gamma-butyrolactone. The compounds of the invention are substituted at the alpha position on the butyrolactone ring.

NITRATION

The first step in the practice of the method of the instant invention is the low temperature nitration of a starting material having the following formula:

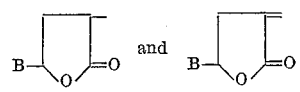

wherein X is a $C_1$–$C_4$ hydrocarbon group, D is H or $C_1$–$C_4$ alkyl, and A is selected from the following:

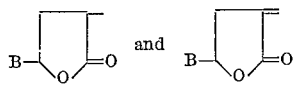

Certain of the starting materials are known. For example, Losanitsch (Monatsh. 35, 311, 1914) discloses alpha-(Benzal)-gamma-valerolactone:

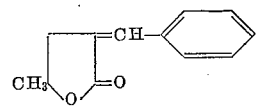

German Patent No. 844,292 of 1944 discloses alpha-(benzal)-gamma-butyrolactone:

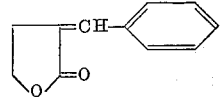

which is now a commercially available compound. The German patent discloses the condensation of butyrolactone with benzaldehyde to produce the above compound and further discloses the hydrogenation thereof to produce alpha-(benzyl)-gamma-butyrolactone:

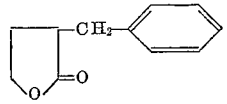

Although the other starting materials are new compounds, we have found that these other compounds may be prepared by carrying out the reactions described by Losanitsch and the German patent. For example, the apparatus used consists of a 500 milliliter three neck flask fitted with a stirrer, reflux condenser, thermometer and nitrogen inlet tube. A charge of 0.1 mol of p-tolyl aldehyde and 0.2 mol of butyrolactone dissolved in 100 ml. of benzene is added to the flask and, under stirring cooled down to 3° C. by means of an ice bath. Nitrogen is passed over the reaction mixture; and over a period of 15 minutes 0.25 mol of sodium methylate is added incrementally. The temperature rises to 27° C. and the mixture becomes a brownish jelly, which is then diluted with 100 ml. of additional benzene. Stirring is continued for 3 more hours, then the mixture is heated at 60–65° C. on a water bath for 45 minutes. After standing overnight, sufficient 10% aqueous sulfuric acid is added under stirring to make the reaction mixture acidic; stirring is continued for 1 hour and the precipitate which has formed is separated on a suction filter and washed thoroughly with water. The yield was 46% of material having a melting point of 63–64° C. (after recrystallization from ethanol). Analysis for the product calculated for $C_{12}H_{12}O_2$ is C=76.57 and H=6.43; found: C=76.56 and H=6.43.

The same procedure is repeated using p-isopropyl benzaldehyde in place of the p-tolyl aldehyde and the resulting product has a melting point of 65–66° C. and is obtained in a yield of 62% after recrystallization from ethanol and petroleum ether. Analysis for this product calculated for $C_{14}H_{16}O_2$ is C=77.74 and H=7.46; found: C=76.63 and H=7.67.

The same procedure is repeated using cinnamaldehyde in place of the other aldehydes and the resulting product, after crystallization from methanol, has a melting point of 133.5–135° C., being obtained in a yield of 67%. Analysis for the product calculated for $C_{13}H_{12}O_2$ is C=77.98 and H=6.04; found: C=77.73 and H=6.26.

The same procedure is used to prepare gamma-valerolactone derivatives of the aldehydes just mentioned. Also, gamma-valerolactone and gamma-butyrolactone derivatives are prepared by carrying out the procedure just described using p-ethylbenzaldehyde, p-isobutylbenzaldehyde, phenylacetaldehyde, phenylpropionaldehyde, and phenylbutyraldehyde.

In each of the aforementioned starting materials there is a double bond between the radical A and the radical X, although the radical X is a $C_1$–$C_4$ hydrocarbon group; and the radical D set forth in the generic formula for the starting material is H or a $C_1$–$C_4$ alkyl radical. The unsaturation between the radical A (or the butyrolactone ring) and the radical X is saturated by hydrogenation. For example, a charge of 5 grams of alpha-(4-methylbenzal)-butyrolactone is added to 258 milliliters of methanol, to which is also added 0.5 gram of platinum dioxide, in a Parr apparatus, which is shaken under 45–50 pounds of hydrogen until the pressure remains constant. The catalyst is then removed by filtration, and the solvent distilled off. The product may be recrystallized. The instant product is alpha-(4-methylbenzyl)-butyrolactone obtained in a yield of 99% and having a boiling point of 135° C. at 4 mm. Hg; and analysis for the instant product calculated for $C_{12}H_{14}O_2$ is C=75.75 and H=7.43; found: C=75.83 and H=7.89.

The same procedure is carried out using alpha-(4-isopropylbenzal)-butyrolactone to obtain a yield of 92% of alpha-(4-isopropylbenzyl)-butyrolactone boiling at 138–140° C. at 5 mm. Hg; and analysis calculated for $C_{14}H_{18}O_2$ is C=77.03 and H=8.71; and found: C=76.69 and H=8.48.

The same procedure is carried out using alpha-cinnamal-butyrolactone to obtain alpha-(3-phenyl-1-propyl)-butyrolactone which is a colorless oily liquid.

The nitration of the instant starting material is carried out by subjecting the starting material to a nitrating agent at minus 10° C. to 10° C., and preferably 0° C. to 5° C., to substitute at least one nitro group on the benzene ring, according to Equation 1 below:

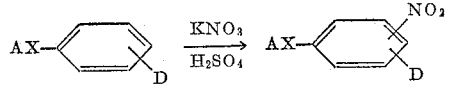

Using an excess of nitrating agent, small yields of a dinitro compound are obtained and both of the nitro groups will undergo the reactions hereinafter described for only a single nitro group.

It is important to note that the condensations of nitrobenzaldehydes with butyrolactone, using the Losanitsch and the German patent process, do not proceed satisfactorily. The o-nitrobenzaldehyde and p-nitrobenzaldehyde reactions give substantially no yield and the m-nitrobenzaldehyde reaction gives only a slight yield. It also would be expected that the reaction of Equation 1 above using, for example, alpha-(benzal)-butyrolactone would not proceed as indicated, because of the unsaturation in the side chain (connecting the benzal group with the alpha position of the butyrolactone ring). Instead, appreciable nitration at the ortho and para positions takes place using the reaction of Equation 1, with slight substitution at the meta position. In view of this, it can be assumed that the carbonium ion structures involved in the mechanism of the nitration are as indicated in Equation 2 below:

(2)
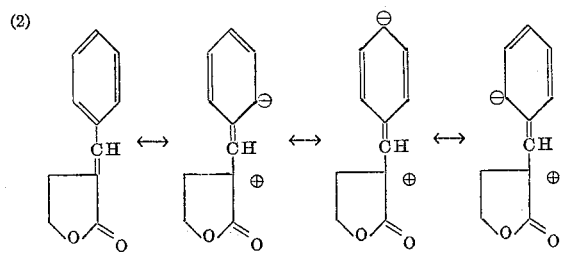

It is important to also control the nitration temperature, or the yield is substantially lost in the form of tars and other undesirable by-products. The nitrating agent used, so far as is known, may be any conventional nitrating agent, although strongly active nitrating agents would have to be added to the reaction mixture very slowly and carefully so that the critical temperature range is maintained. The nitrating agents which may be used include concentrated or fuming nitric acid, a concentrated sulfuric acid-nitric acid system and similar conventional nitrating agents; but preferably the nitrating agent used is a metal nitrate dissolved in concentrated sulfuric acid. The amount of metal nitrate used is the molar equivalent (up to about a 10% excess) of the amount of butyrolactone derivative to be nitrated and the metal nitrate is used in combination with about 5 to 20 times its weight of concentrated (100.5%) sulfuric acid. Part of the total amount of concentrated sulfuric acid is ordinarily used to initially dissolve the butyrolactone derivative and the metal nitrate is dissolved in the remainder and added dropwise to the reaction mixture. The total concentrated sulfuric acid is approximately 10 times the total weight of the metal nitrate in the preferred reaction. If the substitution of two nitro groups is desired, the same reaction conditions are used except that twice as much metal nitrate is used. The preferred metal nitrate is potassium nitrate.

*Example 1*

A charge of 0.3 mol of alpha-(benzal)-butyrolactone is dissolved in 180 ml. of concentrated sulfuric acid and the mixture is cooled by means of an ice-salt bath. With stirring, a solution of 0.33 mol of $KNO_3$ in 140 ml. of concentrated sulfuric acid is added dropwise over a period of an hour, during which time the internal temperature of the reaction mixture is held at 0° C. to 5° C. The reaction mixture is then kept for 3 more hours in the ice bath and finally poured onto ice. A slightly yellow precipitate results, which is filtered on a suction filter and thoroughly washed with water until the washings are neutral, then washed with cold methanol. This crude product is then treated briefly with 250 ml. of hot methanol and filtered hot; again washed with hot and cold methanol, and then with ether. This results in a yield of 40 grams (61%) of alpha-(p-nitrobenzal)-butyrolactone in the form of yellow crystals melting at 201–202° C. Analysis for alpha-(p-nitrobenzal)-butyrolactone calculated as $C_{11}H_9NO_4$ is C=60.27 and H=4.14; and found: C=60.02 and H=3.92. This compound produces a uterine sedative action of about ⅕ of that papaverine.

The methanol filtrates of alpha-(p-nitrobenzal)-butyrolactone described in the foregoing paragraph are concentrated to yield, upon one recrystallization from methanol, 11.9 grams (or 18% yield) of alpha-(o-nitrobenzal)-butyrolactone in the form of yellowish-white crystals melting at 96-97° C. After two more recrystallizations from methanol, the melting point is 96–97.5° C. Analysis for alpha-(o-nitrobenzal)-butyrolactone calculated for $C_{11}H_9NO_4$ is C=60.27, H=4.14, N=6.39; and found: C=60.15, H=4.03, N=6.58.

Various amounts of alpha-(m-nitrobenzal)-butyrolactone are also obtained. This material has a melting point of 147–148° C.

*Example 2*

A charge of 0.1 mol of alpha-(benzal)-butyrolactone is dissolved in 60 ml. of concentrated sulfuric acid under external cooling in an ice bath. With stirring, a solution of 0.22 mol of potassium nitrate in 100 ml. of concentrated sulfuric acid is added dropwise over a period of 15 minutes. Because the internal temperature reaches as high as 22–25° C. a substantial amount of resinous tarry product is obtained and the yield of alpha-(2,4-dinitrobenzal)-butyrolactone is less. Stirring is continued for 2 more hours at 20–30° C., and then the mixture is poured on ice. A resinous precipitate occurred which was filtered, washed and recrystallized from 50 ml. of methanol to yield 3.9 grams (15%) of crude material melting at about 131–136° C. Recrystallization of the crude product required 250 ml. of methanol; and on cooling, two different kinds of crystals appeared which were filtered and separated manually. The fine needles in this group have a melting point of 185–190° C. and these are obtained in a small yield of 0.3 gram (probably a mixture of alpha-(p-nitrobenzal)-butyrolactone and alpha-(m-nitrobenzal)-butyrolactone). Smaller octahedral crystals also obtained at a melting point of 131.5–133.5° C. had a yield of 2.8 grams. These latter crystals were recrystallized from 100 ml. of methanol to obtain yellowish cubes melting at 134–137° C., plus a small amount of brownish powder melting at 159–190° C. The cubes are separated manually and recrystallized three times from methanol to give substantially pure alpha-(2,4-dinitrobenzal)-butyrolactone having a melting point of 136.5–137.5° C. Analysis for alpha-(2,4-dinitrobenzal)-butyrolactone calculated for $C_{11}H_{18}N_2O_6$ is C=50.01, H=3.05, N=10.60; and found: C=50.07, H=3.04, N=10.72.

*Example 3*

The procedure of Example 1 is carried out except that the starting material used is alpha-(benzyl)-butyrolactone and the resulting products are alpha-(p-nitrobenzyl)-butyrolactone, alpha-(o-nitrobenzyl)-butyrolactone and trace amounts of alpha-(m-nitrobenzyl)-butyrolactone. Corresponding para, ortho and meta nitro substituted compounds are obtained by carrying out the same procedure using alpha-(cinnamal)-butyrolactone or alpha-(3-phenyl-1-propyl)-butyrolactone.

The corresponding o-nitro substituted compounds of the invention are obtained by carrying out the process of Example 1 using alpha-(p-methylbenzyl)-butyrolactone, alpha-(p-methylbenzal)-butyrolactone, alpha-(p-isopropylbenzal)-butyrolactone, and alpha-(p-isopropylbenzyl)-butyrolactone.

*Example 4*

Using an apparatus consisting of a 500 ml. three neck flask fitted with a stirrer, reflux condenser, thermometer and nitrogen inlet tube, the flask is charged with 0.1 mol of m-nitrobenzaldehyde and 0.2 mol of butyrolactone dissolved in 100 cc. of benzene and, under stirring, cooled down to 3° C. by means of an ice-salt bath. Nitrogen is maintained over the reaction mixture. Over a period of 15 minutes, 0.15 mol of sodium methylate is added incrementally; and the temperature rises to about 30° C. and the mixture becomes a brownish jelly which is diluted with another 100 cc. of benzene; and stirring is continued for 1 more hour. Then the mixture is heated in a water bath for 1 hour at 60–65° C. After standing overnight, sufficient 10% aqueous sulfuric acid is added under stirring to make the mixture acidic; stirring is continued for 1 hour and the precipitate which has formed is filtered and washed thoroughly with water. The product obtained in a yield of only 15% is alpha-(m-nitrobenzal)-butyrolactone which, after recrystallization from methanol, at a melting point of 147–148° C. Analysis for alpha - (m - nitrobenzal) - butyrolactone calculated for $C_{11}H_9NO_4$ is C=60.2, H=4.14; and found: C=60.70, H=4.23.

Substantially no yield is obtained carrying out this same procedure using o-nitrobenzaldehyde or p-nitrobenzaldehyde.

The resulting nitration products of the instant invention will thus have the following generic formula:

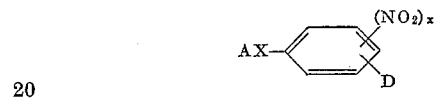

wherein x is 1 or 2.

AMINATION

The conversion of the nitro group to an amino group in the instant butyrolactone derivatives is accomplished by subjecting the nitro derivative to an acidic metal halide reducing agent. The acid usually used is hydrochloric acid and the treatment with the acidic metal halide is followed by heat treatment with a suitable base such as ammonia to remove excess hydrochloric acid, so as to obtain the resulting amino butyrolactone derivative, rather than its hydrochloride. The metal halide reducing agent is preferably stannous chloride ($SnCl_2$), but it may be a halide of any metal whose atom exhibits two or more valencies (in plural stages of oxidation). The metal atom employed in the reducing agent is in a lower stage of oxidation, such as in stannous chloride; and during the reaction it is converted to a higher stage of oxidation such as in stannic chloride ($SnCl_4$). The metal atom thus picks up the acid anion and the acid H is free to substitute for the O's of the nitro group. This reaction is unique in that it does not involve direct hydrogenation which would affect the double bond connected to the alpha position of the butyrolactone ring. For example, alpha-(p-nitrobenzal)-butyrolactone may be converted to alpha-(p-aminobenzal)-butyrolactone by the instant reaction, according to Equation 3 below:

(3)

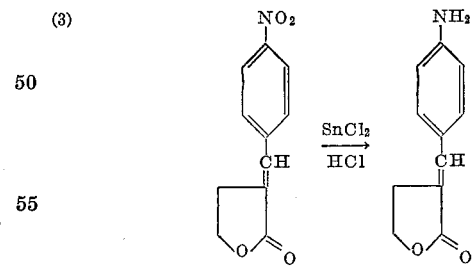

Generically, the reaction is represented by Equation 4 below:

(4)

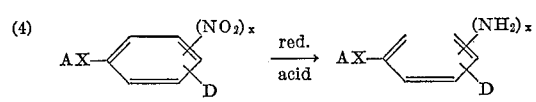

*Example 5*

A charge of 0.0675 mol of alpha-(m-nitrobenzal)-butyrolactone is added to 0.4 mol of $SnCl_2.2H_2O$ dissolved in 225 ml. of HCl. Substantially the entire amount of the charge enters in the solution, and after a few minutes moderately exothermic reaction occurs and the mixture solidifies. After 24 hours standing at room temperature, the precipitate is filtered by suction and immediately added to 300 ml. of concentrated aqueous ammonia and stirred for several hours at room temperature. The residue is filtered again, washed thoroughly with water and dried over $P_2O_5$ at 5 mm. Hg. The resulting brown-yellowish powder is then extracted with chloroform in a Soxhlet apparatus for 24 hours until the residue does not contain any more organic material. This is apparent from the color, since the exhausted inorganic powder is brownish-gray and does not show any yellowish zones. The chloroform extract is evaporated to dryness and the resulting yellow residue recrystallized from methanol, yielding 9.3 grams of yellow leaflets melting at 164–165.5° C. Analysis for alpha-(m-aminobenzal)-butyrolactone calculated for $C_{11}H_{11}NO_2$ is C=69.82 and H=5.86; and found: C=69.73, H=6.05. This compound produces a uterine sedative action of about 1/10 that of papaverine.

Alpha-(m-aminobenzal)-butyrolactone.hydrochloride is prepared by reacting the instant butyrolactone with an equimolar proportion of hydrochloric acid, and after several recrystallizations from 95% aqueous ethanol, the product is a cream colored crystalline product decomposing at 237–240° C. Analysis calculated for $$C_{11}H_{12}ClNO_2$$

is C=58.53, H=5.36, N=6.21; and found: C=58.11, H=5.45, N=5.93.

Alpha-(m-aminobenzyl)-butyrolactone is prepared by carrying out the reaction of the first paragraph of this example using, as a starting material, alpha-(m-nitrobenzyl)-butyrolactone; or by hydrogenating alpha-(m-aminobenzal)-butyrolactone in accordance with the following procedure: A charge of 5 grams of alpha-(m-aminobenzal)-butyrolactone is suspended in 250 ml. of methanol, to which is added 0.5 gram of platinum dioxide. This reaction mixture is shaken under 45–50 pounds of hydrogen pressure in a Parr apparatus until the pressure remains constant. The catalyst is removed by filtration, the solvent by distillation and the residue is recrystallized from methanol to obtain alpha-(m-aminobenzyl)-butyrolactone in the form of light tan crystals melting at 73.5–75° C.

The procedure of the foregoing paragraph is carried out by using, as a starting material, alpha-(p-nitrobenzal)-butyrolactone, and the corresponding products are obtained. For example, alpha-(p-aminobenzal)-butyrolactone is in the form of amber crystals melting at 194–195.5° C. Alpha-(p-aminobenzyl)-butyrolactone is in the form of light tan crystals melting at 84.5–85.5° C. Calculated N is 7.33 on the basis of $C_{11}H_3NO_2$ and elemental analysis establishes that N is 7.44.

*Example 6*

A procedure is carried out that is the same as that of the foregoing example, except that the starting material is alpha-(o-nitrobenzal)-butyrolactone and the corresponding products are obtained. For example, alpha-(o-aminobenzal)-butyrolactone is obtained in the form of yellow crystals melting at 149–150° C. This material produces a uterine sedative action of about 1/20 of that of papaverine. Elemental analysis calculated for $C_{11}H_{11}NO_2$ is N=7.40; and found: N=7.47.

Alpha-(o-aminobenzal) - butyrolactone.hydrochloride thus prepared is in the form of pale yellow crystals melting at 198–199° C. and this compound produces a uterine sedative action of about 1/10 that of papaverine. Elemental analysis calculated on the basis of $C_{11}H_2NO_2Cl$ is Cl=15.72; and found: Cl=15.72.

The corresponding amino derivatives are prepared by carrying out the procedure of the foregoing example using instead as nitro derivatives alpha-(2-nitro-4-methylbenzyl)-butyrolactone, alpha-(3-(p-nitrophenyl)-1-propyl) - butyrolactone, alpha-(2-nitro-4-methylbenzal)-butyrolactone, alpha-(p-nitro-cinnamal)-butyrolactone, and alpha-(2,4-dinitrobenzal)-butyrolactone. In the case of the last mentioned compound twice as much reducing agent is employed. Corresponding amino compounds are also obtained carrying out the instant procedure using as starting materials alpha-(2-nitro-4-isopropylbenzyl)-butyrolactone and alpha-(2-nitro-4-isopropylbenzal)-butyrolactone.

The amino compounds of the invention thus have the following generic formula:

AMIDATION

Amides corresponding to the amine compound above specified (in the generic formula) may be prepared in the practice of the instant invention by reaction of such amino compounds with an acid chloride in a suitable solvent. The amount of solvent used should be at least sufficient to dissolve the reactants and may range from 5 to 20 times the weight of the amine reactant. If a basic solvent such as pyridine is used, the acid chloride and the amine compound are reacted in equimolecular proportions. If an inert solvent such as ethanol or benzene is used, two molecular equivalents of the amine compound are reacted with one molecular equivalent of the acid chloride; and this is because the amine compound itself must be used to remove the hydrochloric acid formed in the reaction. One-half of the amine compound forms an amine hydrochloride and the other half is reacted to form the desired amide product. In the case of either type of solvent, the reaction mixture may be poured into an equal volume of water and the amide precipitates and may be recovered. The remaining ingredients remain in the liquid phase.

*Example 7*

A charge of 1 mol of alpha-(p-aminobenzal)-butyrolactone is dissolved in 10 times its weight pyridine and 1 mol of acetyl chloride is added slowly to complete the reaction. The reaction mixture is then poured into an equal volume of water to precipitate cream colored crystals of alpha-(p-acetamidobenzal)-butyrolactone, which when dried and purified by recrystallization has a melting point of 199–200° C. Calculated elemental analysis for $C_{13}H_{13}NO_3$ is N=6.06; and found: N=6.07. This compound is found to produce a uterine sedative action of about 1/20 of that of papaverine and it exhibits stronger anti-bacterial activity than sulfanilamide or sulfadiazine with respect to *Micrococcus pyogenes*.

The same result is obtained using benzene as the solvent and using two mols instead of one mol of the alpha-(p-aminobenzal)-butyrolactone.

*Example 8*

A charge of 2 mols of alpha-(m-aminobenzal)-butyrolactone is dissolved in 10 times its weight of ethanol and 1 mol of acetyl chloride is added slowly to complete the reaction. The reaction mixture is then poured into an equal volume of water and cream colored crystals of alpha-(m-acetamidobenzal)-butyrolactone precipitate, recovered by filtration and are purified by recrystallization to yield crystals having a melting point of 181.5–182° C. Calculated elemental analysis on the basis of $C_{13}H_{13}NO_3$ is N=6.06; and found: N=6.21. This compound produces a uterine sedative action of about 1/10 that of papaverine and it exhibits antibacterial activity with respect to *Streptococcus pyogenes*.

Corresponding acetamido compounds are prepared by carrying out the procedure of the foregoing paragraph using, instead of the alpha-(m-aminobenzal)-butyrolactone, such other amino butyrolactone derivatives as alpha-(o-aminobenzal)-butyrolactone, alpha-(o - aminobenzyl)-butyrolactone, alpha-(p - aminobenzyl) - butyrolactone, alpha-(m-aminobenzyl)-butyrolactone, alpha - (2,4 - diaminobenzal)-butyrolactone, alpha-(2-amino-4-isopropylbenzal)-butyrolactone, alpha-(2-amino-4 - methylbenzyl)-butyrolactone, alpha-(p-aminocinnamal)-butyrolactone, and other compounds disclosed hereinbefore.

It is also important to note that each of the amino butyrolactone derivatives and each of the aforementioned acetamido butyrolactones cannot be prepared by the reaction of the German patent. In other words, they cannot be prepared by condensing a butyrolactone with the corresponding amino or acetamido benzaldehyde. The reaction sequence to the nitro compound, then to the amino compound, and finally to the acetamido compound is thus the only known way of preparing the instant novel acetamido derivatives of butyrolactone. The same is true of the sulfonamido derivatives which are described hereinafter.

*Example 9*

A charge of 2 mols of alpha-(p-aminobenzal)-butyrolactone is dissolved in 10 times its weight of ethanol and 1 mol of p-aminobenzene sulfonyl chloride is added slowly to complete the reaction. The reaction mixture is then poured into an equal volume of water to obtain a precipitate of alpha - (p - (p-aminobenzenesulfonamido)-benzal)-butyrolactone, which is removed by filtration, dried and purified by recrystallization.

*Example 10*

A procedure corresponding to the procedure of the previous example is carried out using alpha-(m-aminobenzal)-butyrolactone and benzenesulfonyl chloride, and the resulting product is alpha-(m-benzenesulfonamidobenzal)-butyrolactone in the form of white crystals melting at 157–158° C. Elemental analysis calculated for $C_{17}H_{15}NO_4S$ is C=61.99, H=4.59; and found: C=62.10, H=4.73. This compound produces a uterine sedative action of about 1/10 of that of papaverine.

*Example 11*

A procedure is carried out that is the same as that of the foregoing example except that alpha-(p-aminobenzal)-butyrolactone is the butyrolactone derivative used and the resulting product is alpha-(p-benzenesulfonamidobenzal)-butyrolactone in the form of brown crystals melting with decomposition at 226–228° C. Elemental analysis calculated on the basis of $C_{17}H_{15}NO_4S$ is N=4.25; and found: N=3.90.

If the same procedure is carried out using alpha-(o-aminobenzal)-butyrolactone as the butyrolactone derivative, a smaller yield of alpha-(o-benzenesulfonamidobenzal)-butyrolactone is obtained.

Corresponding reactions may also be carried out using alpha - (o - aminobenzyl) - butyrolactone and alpha - (p-aminobenzyl-butyrolactone.

*Example 12*

The procedure of the foregoing example is employed using, as butyrolactone derivatives, alpha-(p-aminocinnamal)-butyrolactone, alpha - (2-amino-3-methylbenzal)-butyrolactone, alpha - (2 - methyl-4-aminobenzal)-butyrolactone, and alpha-(2-amino-4-isopropylbenzal)-butyrolactone and the corresponding sulfonamido compounds are obtained.

*Example 13*

A charge of 2 mols of alpha-(p-aminobenzal)-butyrolactone is dissolved in 10 times its weight of ethanol and 1 mol of p-nitrobenzenesulfonyl chloride is added slowly to complete the reaction. The reaction mixture is then poured into an equal volume of water and a yellow precipitate is formed, which is separated by filtration, dried and recrystallized to yield bright yellow crystals of alpha-(p-(p-nitrobenzenesulfonamido) - benzal) - butyrolactone melting at 212–214° C. Elemental analysis calculated for $C_{17}H_{14}N_2O_6S$ is C=54.54, H=3.77; and found: C=54.32, H=4.21.

*Example 14*

The procedure of the previous example is carried out using alpha-(m-aminobenzal)-butyrolactone and p-nitrobenzenesulfonyl chloride and the resulting product is alpha-(m-(p-nitrobenzenesulfonamido)-benzal) - butyrolactone in the form of amber crystals melting at 238–239° C.

*Example 15*

The procedure of the foregoing example is carried out using alpha-(p-aminobenzal)-butyrolactone and p-acetamidobenzenesulfonyl chloride and the resulting alpha-(p-(p-acetamidobenzenesulfonamido) - benzal) - butyrolactone is obtained in the form of light amber colored crystals melting at 253–253.5° C.

*Example 16*

A procedure is carried out that is the same as the foregoing example except that alpha-(m-aminobenzal)-butyrolactone is used and the resulting alpha-(m-(p-acetamidobenzenesulfonamido)-benzal)-butyrolactone is obtained in the form of a light brown amorphous material melting at 251–252.5° C.

It will thus be seen that one of the instant chlorides which may be used in preparing the amido derivative is ClCOD, wherein D has the aforementioned definition of $C_1$–$C_4$ alkyl. These acid chlorides are acetyl chloride, propionyl chloride, butyryl chloride, etc. Another type of acid chloride which may be used in the practice of the instant invention to form the amides is selected from the benzenesulfonyl chloride series, which may have the formula $ClSO_2C_6H_4E$, wherein E is selected from the group consisting of —H, —$NH_2$, —$NHCOCH_3$, —$NO_2$, —NHD, and —$ND_2$. Corresponding amino products are prepared by carrying out the reaction of the previous example using p-methylaminobenzenesulfonyl chloride and p-N,N-dimethylaminobenzenesulfonyl chloride.

The primary amino group in, for example, alpha-(aminobenzal)-butyrolactone may also be converted to a secondary amino group by reaction with an alkyl chloride such as ClD (wherein D has the definition already disclosed). For example, a charge of 0.1 mol of alpha-(p-aminobenzal)-butyrolactone, 0.1 mol of ethyl chloride, 2 mols of methanol and 0.1 mol of trimethylamine is refluxed for two hours and the resulting mixture is poured into an equal volume of water from which alpha-(p-ethylaminobenzal)-butyrolactone precipitates and is separated and dried.

It will be understood that modifications and variations may be effected without departing from the spirit and scope of the novel concepts of the present invention.

We claim as our invention:
1. Alpha-(p-nitrobenzal)-gamma-butyrolactone.
2. Alpha-(o-nitrobenzal)-gamma-butyrolactone.
3. Alpha-(p-aminobenzal)-gamma-butyrolactone.
4. Alpha-(o-aminobenzal)-gamma-butyrolactone.
5. Alpha-(m-nitrobenzal)-gamma-butyrolactone.
6. Alpha-(m-aminobenzal)-gamma-butyrolactone.
7. Alpha-(p-acetamidobenzal)-gamma-butyrolactone.
8. Alpha-(m-acetamidobenzal)-gamma-butyrolactone.
9. Alpha - (m - benzenesulfonamidobenzal)-gamma-butyrolactone.

References Cited in the file of this patent

Losanitsch: Chem. Absts., 8, pages 2364–5 (1914).
Degering: "An Outline of Organic Nitrogen Compounds," page 295, under paragraph 905, and page 303, paragraph 943, Univ. Lithoprinters, Ypsilanti, Mich. (1945).
Degering: "An Outline of Organic Nitrogen Compounds," Univ. Lithoprinters, Ypsilanti, Mich. (1945), paragraphs 1454–8 on page 481–482.
Groggins: "Unit Processes in Organic Chemistry," McGraw-Hill (1947), page 1.
Kondo et al.: Chem. Absts., 50, page 10043c (1956).